United States Patent [19]
Elder

[11] Patent Number: 6,123,374
[45] Date of Patent: Sep. 26, 2000

[54] MINI HOLE DIGGER

[76] Inventor: Ernest Elder, 26-25 95th St., Jackson Heights, N.Y. 11369

[21] Appl. No.: 09/389,736

[22] Filed: Sep. 7, 1999

[51] Int. Cl.⁷ .................................................... A01B 1/00
[52] U.S. Cl. ............................................ 294/50; 294/50.7
[58] Field of Search ........................... 294/50, 50.5, 50.7, 294/51, 59, 60; 111/92, 101, 106; 172/19, 21, 22, 25, 371, 378; 175/20

[56] References Cited

U.S. PATENT DOCUMENTS

| | | | |
|---|---|---|---|
| 235,463 | 12/1880 | Sidwell | 294/50.7 X |
| 433,957 | 8/1890 | O'Meara | 294/50.7 X |
| 471,767 | 3/1892 | Cross | 294/50.5 |
| 985,596 | 2/1911 | Jacobs | 294/50.7 X |
| 1,939,897 | 12/1933 | Hill | 294/50.5 |
| 3,506,296 | 4/1970 | Nelson | 294/50.7 X |
| 4,884,638 | 12/1989 | Hoffman | 294/50.7 X |

*Primary Examiner*—Johnny D. Cherry

[57] ABSTRACT

A new and improved mini hole digger with a handle having a hook secured to a lower surface thereof and two shafts, each of which is secured to the lower surface of the handle inward of an end portion thereof. A foot lever has two apertures formed therethrough. The foot lever has a hook secured thereto between the two apertures formed therethrough. A securement aperture is formed in a lower surface between the two apertures formed therethrough. The two apertures slidably receive the two shafts therethrough. The two apertures function to allow the foot lever to slide up and down along each of the two shafts. A spring is secured to the hook of the handle and to the hook of the foot lever. A digger housing has an aperture formed therethrough. The housing is secured to each of the two shafts outward of the aperture formed therethrough. The housing has a plurality of jagged edges integral therewith. A rod is received within the digger housing. The rod is secured to the securement aperture of the foot lever through the aperture formed through the digger housing. The rod has a push plate secured to its other end.

3 Claims, 4 Drawing Sheets

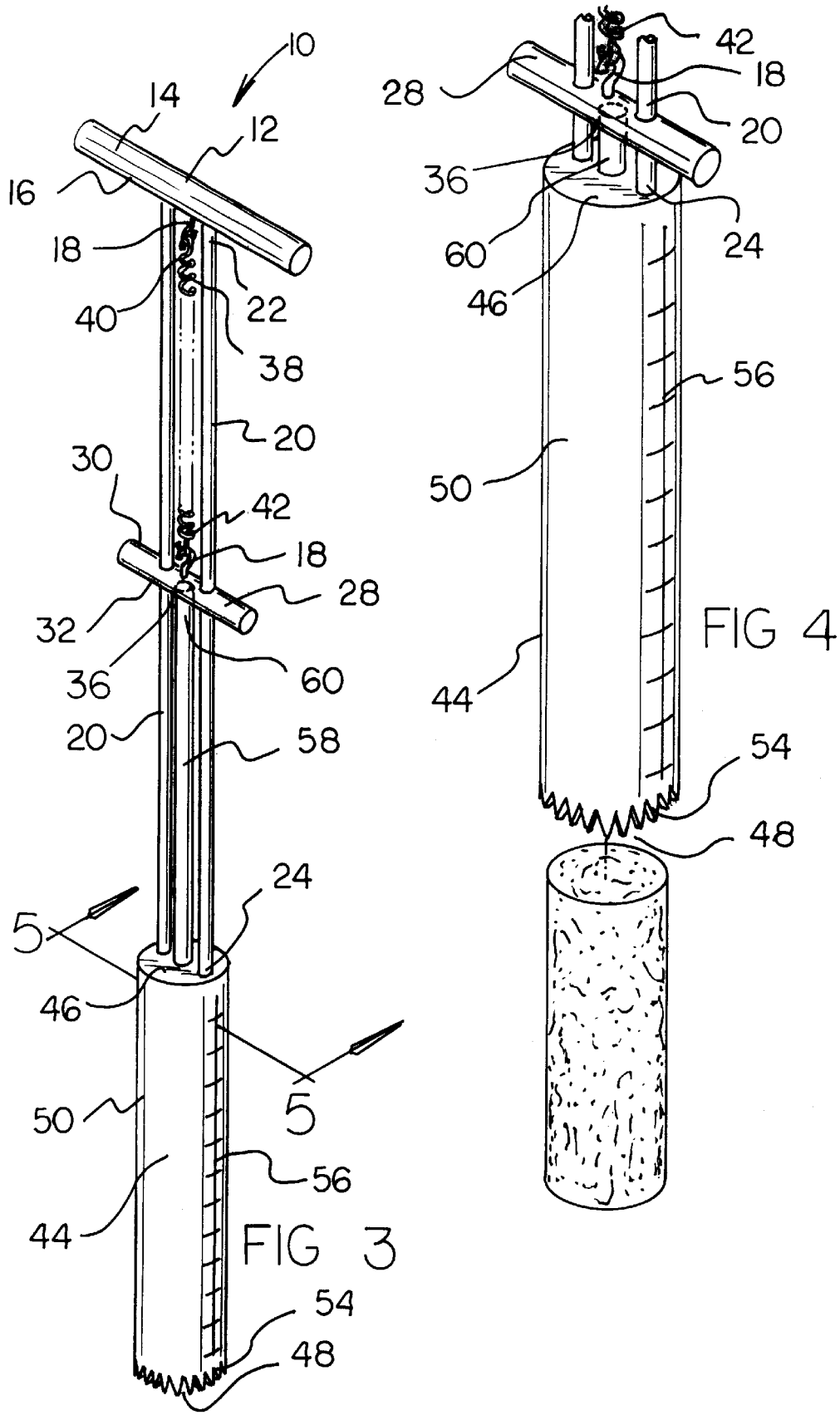

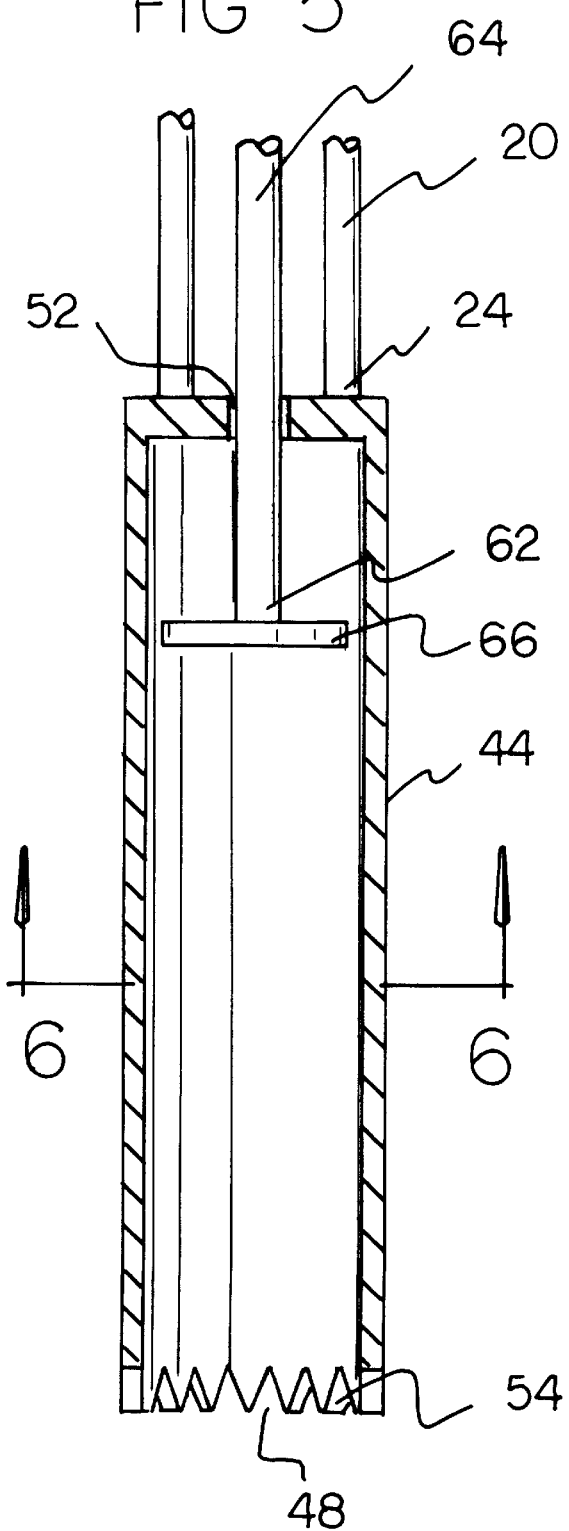
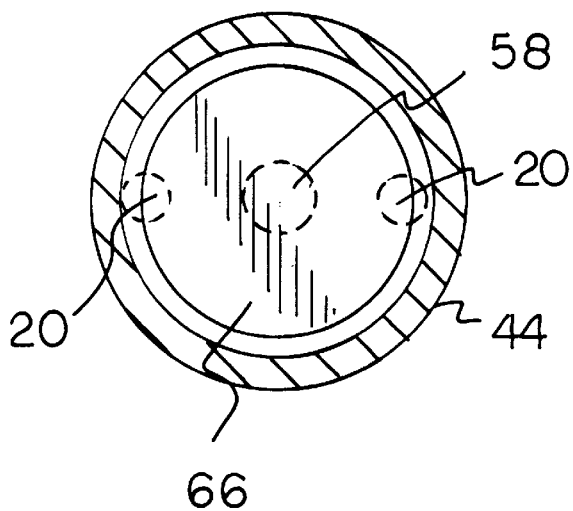

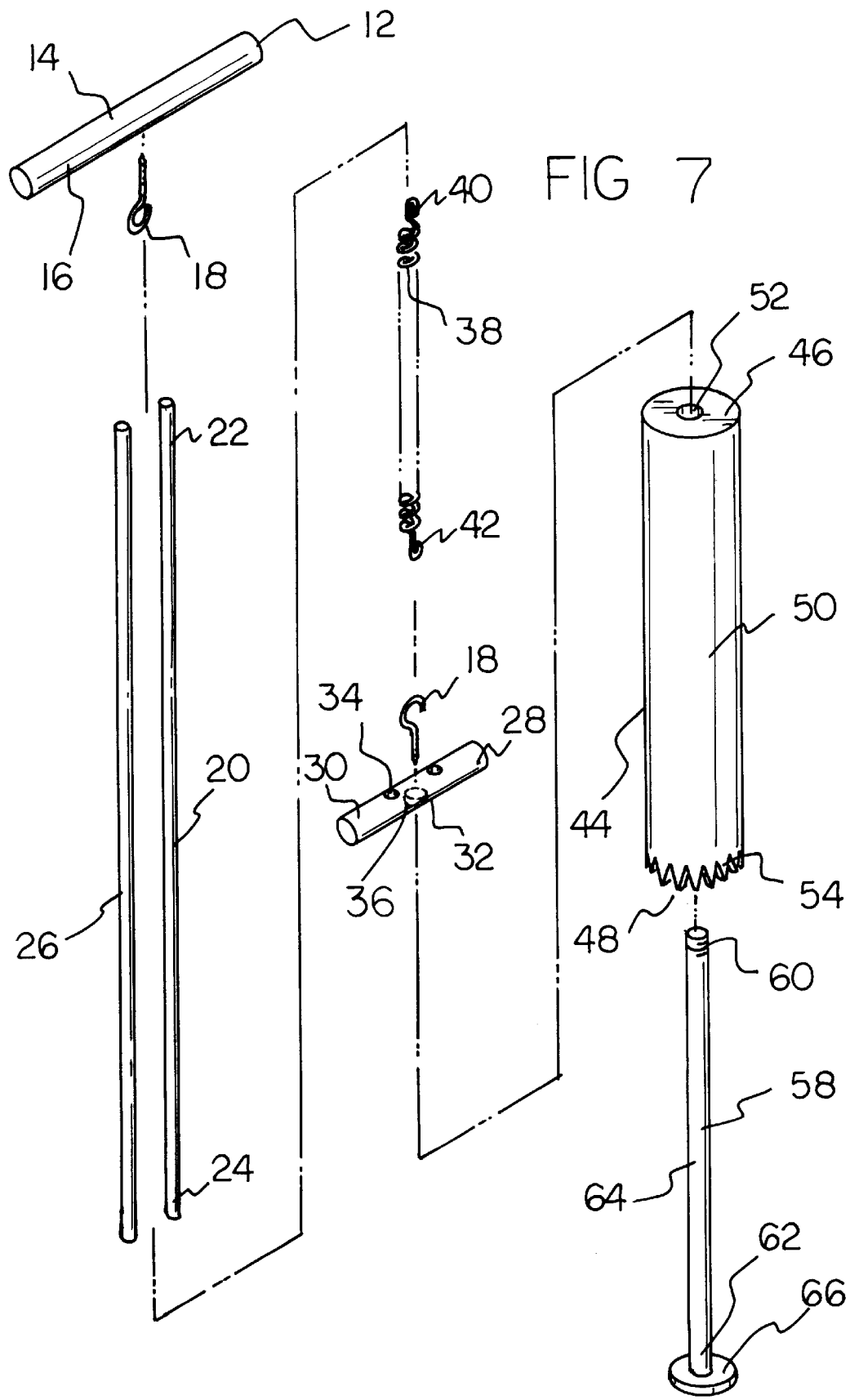

MINI HOLE DIGGER

BACKGROUND OF THE INVENTION

1. Field of the Invention

The present invention relates to a mini hole digger and more particularly pertains to digging holes in a variety of depths and sizes with ease of use and practicality with a mini hole digger.

2. Description of the Prior Art

The use of hole diggers is known in the prior art. More specifically, hole diggers heretofore devised and utilized for the purpose of digging holes are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,186,263 to Kejr et al. discloses a soil sample probe.

U.S. Pat. No. 5,273,331 to Burnham discloses a post hole digger.

U.S. Pat. No. 5,080,027 to Brothers discloses a seed planter ground hole manual tool.

U.S. Pat. No. 5,052,314 to Leini discloses a planting tube.

U.S. Pat. No. 5,133,269 to Charneski discloses a plant hole digger with cylindrical cutter.

While these devices fulfill their respective, particular objective and requirements, the aforementioned patents do not describe a mini hole digger for digging holes in a variety of depths and sizes with ease of use and practicality.

In this respect, the mini hole digger according to the present invention substantially departs from the conventional concepts and designs of the prior art, and in doing so provides an apparatus primarily developed for the purpose of digging holes in a variety of depths and sizes with ease of use and practicality.

Therefore, it can be appreciated that there exists a continuing need for a new and improved mini hole digger which can be used for digging holes in a variety of depths and sizes with ease of use and practicality. In this regard, the present invention substantially fulfills this need.

SUMMARY OF THE INVENTION

In the view of the foregoing disadvantages inherent in the known types of hole diggers now present in the prior art, the present invention provides an improved mini hole digger. As such, the general purpose of the present invention, which will be described subsequently in greater detail, is to provide a new and improved mini hole digger and method which has all the advantages of the prior art and none of the disadvantages.

To attain this, the present invention essentially comprises a wooden handle having an upper surface and a lower surface. A metal hook is secured to a middle portion of the lower surface. The device contains two metal shafts. Each of the two metal shafts has a first end, a second end, and an intermediate extent therebetween. The first end of each of the two metal shafts is secured to the lower surface of the wooden handle inward of an end portion thereof. The device contains a foot lever having an upper surface and a lower surface. The foot lever has two apertures formed therethrough. The upper surface has a metal hook secured thereto between the two apertures formed therethrough. A securement aperture is formed in the lower surface between the two apertures formed therethrough. The two apertures slidably receive the two metal shafts therethrough. The two apertures function to allow the foot lever to slide up and down along the intermediate extent of each of the two metal shafts. The device contains a spring having a first end and a second end. The first end is secured to the metal hook of the wooden handle. The second end is secured to the metal hook of the foot lever. The device contains a digger housing having a closed first end, an open second end, an intermediate extent therebetween, and a hollow interior. The closed first end has an aperture formed therethrough. The closed first end is secured to the second end of each of the two metal shafts outward of the aperture formed therethrough. The open second end has a plurality of jagged edges integral therewith. The intermediate extent has a plurality of markings on one side thereof. The markings function to indicate depth to the user. The device contains a metal rod having a first end, a second end, and an intermediate extent therebetween. The metal rod is received within the hollow interior of the digger housing. The first end is secured to the securement aperture of the foot lever through the aperture formed through the closed first end of the digger housing. The second end has a push plate secured thereto.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mini hole digger which has all the advantages of the prior art hole diggers and none of the disadvantages.

It is another object of the present invention to provide a new and improved mini hole digger which may be easily and efficiently manufactured and marketed.

It is a further object of the present invention to provide a new and improved mini hole digger which is of durable and reliable construction.

An even further object of the present invention is to provide a new and improved mini hole digger which is susceptible of a low cost of manufacture with regard to both materials and labor, and which accordingly is then susceptible of low prices of sale to the consuming public, thereby making such a mini hole digger economically available to the buying public.

Still yet another object of the present invention is to provide a new and improved mini hole digger which provides in the apparatuses and methods of the prior art some of the advantages thereof, while simultaneously overcoming some of the disadvantages normally associated therewith.

Even still another object of the present invention is to provide a new and improved mini hole digger for digging holes in a variety of depths and sizes with ease of use and practicality.

Lastly, it is an object of the present invention to provide a new and improved mini hole digger with a handle having a hook secured to a lower surface thereof. Two shafts are provided, each of which is secured to the lower surface of the handle inward of an end portion thereof. A foot lever has two apertures formed therethrough. The foot lever has a hook secured thereto between the two apertures formed therethrough. A securement aperture is formed in a lower surface between the two apertures formed therethrough. The two apertures slidably receive the two shafts therethrough. The two apertures function to allow the foot lever to slide up and down along each of the two shafts. A spring is secured to the hook of the handle and to the hook of the foot lever. A digger housing has an aperture formed therethrough. The housing is secured to each of the two shafts outward of the aperture formed therethrough. The housing has a plurality of jagged edges integral therewith. A rod is received within the digger housing. The rod is secured to the securement aperture of the foot lever through the aperture formed through the digger housing. The rod has a push plate secured to its other end.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the preferred embodiment of the mini hole digger constructed in accordance with the principles of the present invention.

FIG. 4 is a partial perspective view of the present invention illustrating the dispelling of dirt.

FIG. 5 is a cross-sectional view of the present invention taken along line 5—5 of FIG. 3.

FIG. 6 is a cross-sectional view of the present invention taken along line 6—6 of FIG. 5.

FIG. 7 is an exploded elevated view of the present invention.

The same reference numerals refer to the same parts through the various Figures.

DESCRIPTION OF THE PREFERRED EMBODIMENT

Figure 1:
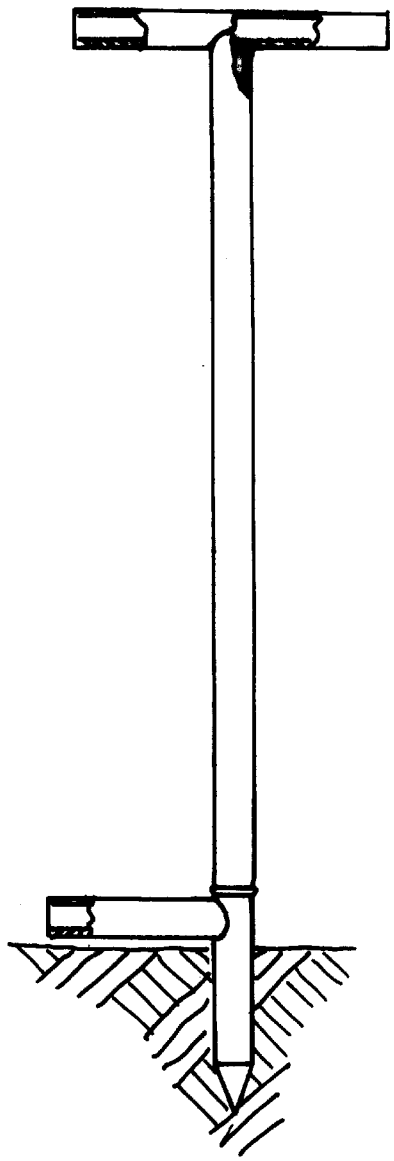
FIG. 1 is a partially broken away and sectioned side elevation view of the prior art seed planter ground hole manual tool.
Figure 2:
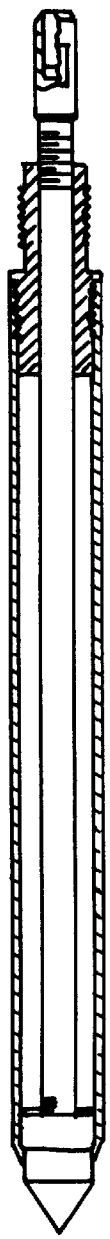
FIG. 2 is a cross-sectional view of the prior art soil sample probe.

With reference now to the drawings, and in particular, to FIG. 3 thereof, the preferred embodiment of the new and improved mini hole digger embodying the principles and concepts of the present invention and generally designated by the reference number 10 will be described.

Specifically, it will be noted in the various Figures that the device relates to a new and improved mini hole digger for digging holes in a variety of depths and sizes with ease of use and practicality. In its broadest context, the device consists of a wooden handle, two metal shafts, a foot lever, a spring, a digger housing, and a metal rod.

The device 10 contains a wooden handle 12 having an upper surface 14 and a lower surface 16. A metal hook 18 is secured to a middle portion of the lower surface 16. The handle 12 is preferably rounded in construction to allow the user to easily get a firm grip.

The device 10 contains two metal shafts 20. Each of the two metal shafts 20 has a first end 22, a second end 24, and an intermediate extent 26 therebetween. The first end 22 of each of the two metal shafts 20 is secured to the lower surface 16 of the wooden handle 12 inward of an end portion thereof.

The device 10 contains a foot lever 28 having an upper surface 30 and a lower surface 32. The foot lever 28 has two apertures 34 formed therethrough. The upper surface 30 has a metal hook 18 secured thereto between the two apertures 34 formed therethrough. A securement aperture 36 is formed in the lower surface 32 between the two apertures 34 formed therethrough. The two apertures 34 slidably receive the two metal shafts 20 therethrough. The two apertures 34 function to allow the foot lever 28 to slide up and down along the intermediate extent 26 of each of the two metal shafts 20.

The device 10 contains a spring 38 having a first end 40 and a second end 42. The first end 40 is secured to the metal hook 18 of the wooden handle 12. The second end 42 is secured to the metal hook 18 of the foot lever 28. The spring 38 returns the foot lever 28 to a position near the wooden handle when not in use.

The device 10 contains a digger housing 44 having a closed first end 46, an open second end 48, an intermediate extent 50 therebetween, and a hollow interior. The closed first end 46 has an aperture 52 formed therethrough. The closed first end 46 is secured to the second end 24 of each of the two metal shafts 20 outward of the aperture 52 formed therethrough. The open second end 48 has a plurality of jagged edges 54 integral therewith. The intermediate extent 50 has a plurality of markings 56 on one side thereof. The markings 56 function to indicate depth to the user.

The device 10 contains a metal rod 58 having a first end 60, a second end 62, and an intermediate extent 64 therebetween. The metal rod 60 is received within the hollow interior of the digger housing 44. The first end 60 is secured to the securement aperture 36 of the foot lever 28 through the aperture 52 formed through the closed first end 48 of the digger housing 44. The second end 62 has a push plate 66 secured thereto.

The present invention 10 is a hole digger which digs a hole about 3 inches in diameter and up to 2 feet deep. It is ideally suited for digging fence post holes.

The unit is approximately 3 feet tall overall and consists of eight primary components: a handle 12, two shafts 20, a spring 38, a foot lever 28, a rod 58, a push plate 66, and the digger housing 44. The wooden handle 12 is connected to the steel housing 44 by two steel shafts 20 about 2 feet long. The wood foot lever 28 has two holes 32 drilled in it to enable it to slide up and down the shafts 20, and a steel rod 58 is connected to its bottom center. This rod 58 is about 18 inches long and has a steel plate 66 welded to its end 62. This steel plate 66 fits inside the 2½ inch steel digger housing 44 which is about 12 inches long and has 2 inch increments 56 etched into it to indicate the depth of the hole. Another vital component is the spring 38 which is attached to the top center of the foot lever 28 and the bottom center of the handle 12. This serves as a means for the foot lever 28 to remain at its uppermost position when not in use.

To operate, the user simply pushes the digger housing 44 as far into the ground as possible. When the unit is pulled back out, the dirt remains in the housing and is removed by pushing down on the foot lever 28.

Most anyone who has any need for installing fences or similar items would be interested in this design because of its ease of use and practicality.

As to the manner of usage and operation of the present invention, the same should be apparent from the above description.

Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A mini hole digger for digging holes in a variety of depths and sizes with ease of use and practicality comprising, in combination:

a wooden handle having an upper surface and a lower surface, a metal hook is secured to a middle portion of the lower surface;

two metal shafts, each of the two metal shafts having a first end, a second end, and an intermediate extent therebetween, the first end of each of the two metal shafts secured to the lower surface of the wooden handle inward of an end portion thereof;

a foot lever having an upper surface and a lower surface, the foot lever having two apertures formed therethrough, the upper surface having a metal hook secured thereto between the two apertures formed therethrough, a securement aperture formed in the lower surface between the two apertures formed therethrough, the two apertures slidably receiving the two metal shafts therethrough, the two apertures functioning to allow the foot lever to slide up and down along the intermediate extent of each of the two metal shafts;

a spring having a first end and a second end, the first end secured to the metal hook of the wooden handle, the second end secured to the metal hook of the foot lever;

a digger housing having a closed first end, an open second end, an intermediate extent therebetween, and a hollow interior, the closed first end having an aperture formed therethrough, the closed first end secured to the second end of each of the two metal shafts outward of the aperture formed therethrough, the open second end having a plurality of jagged edges integral therewith, the intermediate extent having a plurality of markings on one side thereof, the markings functioning to indicate depth to the user; and a metal rod having a first end, a second end, and an intermediate extent therebetween, the metal rod received within the hollow interior of the digger housing, the first end secured to the securement aperture of the foot lever through the aperture formed through the closed first end of the digger housing, the second end having a push plate secured thereto.

2. A mini hole digger for digging holes in a variety of depths and sizes with ease of use and practicality comprising:

a handle having a hook secured to a lower surface thereof;

two shafts, each of the two shafts secured to the lower surface of the handle inward of an end portion thereof;

a foot lever having two apertures formed therethrough, the foot lever having a hook secured thereto between the two apertures formed therethrough, a securement aperture formed in a lower surface between the two apertures formed therethrough, the two apertures slidably receiving the two shafts therethrough, the two apertures functioning to allow the foot lever to slide up and down along each of the two shafts;

a spring secured to the hook of the handle and to the hook of the foot lever;

a digger housing having an aperture formed therethrough, the housing secured to each of the two shafts outward of the aperture formed therethrough, the housing having a plurality of jagged edges integral therewith; and a rod received within the digger housing, the rod secured to the securement aperture of the foot lever through the aperture formed through the digger housing, the rod having a push plate secured to its other end.

3. The digger as described in claim 2 and further including wherein the digger housing has a plurality of markings on one side thereof, the markings functioning to indicate depth to the user.

* * * * *